(12) United States Patent
Heffley et al.

(10) Patent No.: US 7,971,205 B2
(45) Date of Patent: Jun. 28, 2011

(54) HANDLING OF USER MODE THREAD USING NO CONTEXT SWITCH ATTRIBUTE TO DESIGNATE NEAR INTERRUPT DISABLED PRIORITY STATUS

(75) Inventors: Daniel Heffley, Tucson, AZ (US);
Wenjeng Ko, Tucson, AZ (US);
Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 11/291,600

(22) Filed: Dec. 1, 2005

(65) Prior Publication Data
US 2007/0130569 A1 Jun. 7, 2007

(51) Int. Cl.
*G06F 9/46* (2006.01)
*G06F 13/24* (2006.01)
(52) U.S. Cl. ......... 718/108; 718/103; 718/107; 710/262
(58) Field of Classification Search .................. 718/108, 718/103, 107; 710/262
See application file for complete search history.

(56) References Cited

U.S. PATENT DOCUMENTS

| | | | |
|---|---|---|---|
| 5,515,538 A * | 5/1996 | Kleiman | 710/260 |
| 5,937,187 A * | 8/1999 | Kosche et al. | 718/104 |
| 6,029,222 A | 2/2000 | Kamiya | |
| 6,038,631 A | 3/2000 | Suzuki et al. | |
| 6,085,215 A * | 7/2000 | Ramakrishnan et al. | 718/102 |
| 6,105,071 A | 8/2000 | Desnoyers et al. | |
| 6,633,940 B1 | 10/2003 | Alasti et al. | |
| 2003/0154234 A1 * | 8/2003 | Larson | 709/107 |
| 2004/0025160 A1 * | 2/2004 | Dice et al. | 718/102 |
| 2004/0117793 A1 * | 6/2004 | Shaylor | 718/100 |
| 2004/0187117 A1 | 9/2004 | Orion et al. | |
| 2005/0216633 A1 * | 9/2005 | Cavallo | 710/260 |
| 2006/0271938 A1 * | 11/2006 | Gootherts et al. | 718/107 |

FOREIGN PATENT DOCUMENTS

| | | |
|---|---|---|
| WO | 2004036354 A2 | 4/2004 |
| WO | 2005022386 A2 | 3/2005 |

OTHER PUBLICATIONS

Edward Mascarenhas, Vernon Rego; "Ariadne: Architecture of a Portable Threads system supporting Thread Migration"; Software—Practice and Experience, vol. 26(3), 327-356 (Mar. 1996).*
Marsh, B; Scott, M; LeBlanc, T; Markatos, E; "First-class user-level threads"; ACM SIGOPS Operating Systems Review; vol. 25 , Issue 5 (Oct. 1991); pp. 110-121.*

(Continued)

*Primary Examiner* — Emerson C Puente
*Assistant Examiner* — Nikhil Krishnan
(74) *Attorney, Agent, or Firm* — Griffiths & Seaton PLLC (57) ABSTRACT

A method, apparatus and program storage device for providing a no context switch attribute that allows a user mode thread to become a near interrupt disabled priority is disclosed. A thread includes a no context switch attribute. Control of a thread based on the no context switch attribute is much more efficient than the real-time priority because the no context switch attribute bypasses the overhead of scheduling. Moreover, the no context switch attribute may be used to detect whether a thread performs any undesirable operations that can cause the thread to become suspended while in a critical section. The no context switch attribute is configurable to indicate whether execution of the thread can be suspended.

12 Claims, 5 Drawing Sheets

OTHER PUBLICATIONS

Duda, K; Cheriton, D; "Borrowed-virtual-time (BVT) scheduling: supporting latency-sensitive threads in a general-purpose scheduler"; Proceedings of the seventeenth ACM symposium on Operating systems principles; pp. 261-276; Year of Publication: 1999.*

Yangmin Seo, Jungkeun Park, Gwangil Jeon, Seongsoo Hong; "Supporting preemptive multithreading in the ARX real-time operating system"; TENCON 99. Proceedings of the IEEE Region 10 Conference; Publication Date: Sep. 15-17, 1999; vol. 1; on pp. 443-446 vol. 1.*

Krithi Ramamritham, Chia Shen, Oscar Gonzalez, Subhabrata Sen, Shreedhar Shirgurkar; "Using Windows NT for Real-Time Applications: Experimental Observations and Recommendations"; Proceedings of the Fourth IEEE Real-Time Technology and Applications Symposium; Year: 1998.*

Obenland, K.M.; Frazier, T.; Kim, J.S.; Kowalik, J.; "Comparing the real-time performance of Windows NT to an NT real-time extension"; Proceedings of the Fifth IEEE Real-Time Technology and Applications Symposium, 1999.; pp. 142-151; Issue Date: 1999.*

Gimenez, G.; Kim, K.H.; "A Windows CE implementation of a middleware architecture supporting time-triggered message-triggered objects"; 25th Annual International Computer Software and Applications Conference, 2001. COMPSAC 2001.; pp. 181-189; Issue Date: 2001.*

Anderson, Eric and Post, Brad. "Concurrent Programming with the Thread Manager". develop, The Apple Technical Journal, issue 17 (Mar. 1994), pp. 73-98. Apple Computer's Developer Press. <http://old.mactech.com/articles/develop/issue_17/Anderson_Post_final.html>.*

Oddone, Fabrizio. "Preempting the Mac". MacTech, issue 1, vol. 13 (1997). <http://www.mactech.com/articles/mactech/Vol.13/13.01/ThreadPerformanceAnalysis/index.html>.*

* cited by examiner

HANDLING OF USER MODE THREAD USING NO CONTEXT SWITCH ATTRIBUTE TO DESIGNATE NEAR INTERRUPT DISABLED PRIORITY STATUS

BACKGROUND OF THE INVENTION

1. Field of the Invention

This invention relates in general to a computer operating systems, and more particularly to a method, apparatus and program storage device for providing a no context switch attribute that allows a user mode thread to become a near interrupt disabled priority.

2. Description of Related Art

In computing, an operating system (OS) is the system software responsible for the direct control and management of hardware and basic system operations. Additionally, it provides a foundation upon which to run application software such as word processing programs and web browsers. Many modern operating systems support multitasking by which multiple threads share common processing resources such as a processor. A thread in computer science is short for a thread of execution or a sequence of instructions. Threads are basically processes that run in the same memory context. Multiple threads can be executed in parallel on many computer systems. This multithreading generally occurs by time slicing (where a single processor switches between different threads) or by multiprocessing (where threads are executed on separate processors). Threads are similar to processes, but differ in the way that they share resources.

In the case of a computer with a single processor, only one thread is said to be running at any point in time, meaning that the processor is actively executing instructions for that thread. Multitasking solves the problem by scheduling which thread may be running at any given time, and when another waiting thread gets a turn. The act of reassigning a processor from one thread to another one is called a context switch. Each time a process is removed from access to the processor, sufficient information on its current operating state must be stored such that when it is again scheduled to run on the processor it can resume its operation from an identical position. This operational state data is known as its context and the act of removing the process's thread of execution from the processor (and replacing it with another) is known as a process switch or context switch. When context switches occur frequently enough the illusion of parallelism is achieved. Even on computers with more than one processor, multitasking allows many more tasks to be run than there are processors.

An operating system manages the system and runs third-party application software for that system. Thus, the common understanding is that an operating system includes not only the low-level "kernel" that interacts directly with the hardware, but also libraries required by applications as well as basic programs to manipulate files and configure the system. The operating system kernel allows programmers to manipulate threads via the system call interface.

Operating systems may adopt one of many different scheduling strategies, which generally fall into one of the following categories. In multiprogramming systems, the running task keeps running until it performs an operation that requires waiting for an external event (e.g. reading from a tape). Multiprogramming systems are designed to maximize processor usage. In time-sharing systems, the running task is required to relinquish the processor, either voluntarily or by an external event such as a hardware interrupt. Time sharing systems are designed to allow several programs to execute apparently simultaneously. In real-time systems, some waiting tasks are guaranteed to be given the processor when an external event occurs.

The architecture of an operating system includes two main layers: a user mode and a kernel mode. Programs and subsystems in user mode are limited in terms of what system resources they have access to, while the kernel mode has unrestricted access to the system memory and external devices. The user mode is a nonprivileged state where the executing code is forbidden by the hardware from performing certain operations (such as writing to memory not assigned to it) that could destabilize the system or constitute a security hole.

Today's operating systems, e.g., Linux, Windows, Unix, support programs running in user mode and programs running in kernel mode. For example, all of the Windows 2000 subsystems and applications run in user mode, and each subsystem and application runs in its own protected address space. Thus, a process is always running in either user mode or kernel mode. The main body of a user program is executed in user mode and system calls are executed in kernel mode. The kernel mode includes code for providing a protected memory mode with full privileges. The user mode includes privileges to access its own memory area. User applications and environmental subsystems execute in this mode. In addition, user mode is a mechanism in certain operating systems, e.g., Linux, Windows, etc., that lets the user install a separate instance of the operating system within the larger installation. User mode thus lets the user create a virtual machine within the computer, thereby providing he ability to create test situations, for example, without running the risk of creating problems within the main system.

There are several advantages to operating in user mode. Operating in user mode allows an engineer to debug code without having a separate test machine, to setup different versions of the software kernel (main memory and processing area of the software), and to train new users. User mode can also isolate the processes that are running inside it so that a virus or other malicious code may be prevented from infecting the larger machine, thereby saving hours of unplanned reinstallation and rebuilding. User mode is also helpful for testing new network configurations and creating disaster recovery drills because it insulates the main installation from unintentional or intentional damage.

The Open Source Initiative (OSI) was formed in February 1998. OSI hoped that the usage of the label "open source" would eliminate ambiguity, particularly for individuals who perceive "free software" as anti-commercial. Thus, the OSI sought to bring a higher profile to the practical benefits of freely available source code, and wanted to bring major software businesses and other high-tech industries into open source. Open source software refers to computer software and the availability of its source code as open source under an open source license to study, change, and improve its design. Thus, open source refers to software in which the source code is freely available for others to view, amend, and adapt. Typically it's created and maintained by a team of developers that crosses institutional and national boundaries. As such, open source software can't be appropriated by one large proprietary vendor.

Linux is one of the most prominent examples of free software and of open-source development: unlike proprietary operating systems such as Windows and Mac OS, all of its underlying source code is available to the public and anyone can freely use, modify, and redistribute it. In the narrowest sense, the term Linux refers to the Linux kernel, but it is commonly used to describe entire Unix-like operating systems (also known as GNU/Linux) that are based on the Linux kernel combined with libraries and tools from the GNU project and other sources. Most broadly, a Linux distribution bundles large quantities of application software with the core system, and provides more user-friendly installation and upgrades. But Linux (or more accurately GNU/Linux) is just the tip of the iceberg. Today there is a wide range of open source software available, and new projects are being started all the time.

With the popularity of open source kernel (e.g. Linux), more and more controller programs are moving to user mode. However, a controller program constantly requires access to hardware in real-time fashion and therefore needs to allow a user mode thread to run in a near interrupt disabled priority. Some real-time operating systems offer special real time priority. However, to provide flexibility, they still might share the priority with other threads at the same real-time priority.

It can be seen then that there is a need for a method, apparatus and program storage device for providing a no context switch attribute that allows a user mode thread to become a near interrupt disabled priority.

SUMMARY OF THE INVENTION

To overcome the limitations in the prior art described above, and to overcome other limitations that will become apparent upon reading and understanding the present specification, the present invention discloses method, apparatus and program storage device for providing a no context switch attribute that allows a user mode thread to become a near interrupt disabled priority.

The present invention solves the above-described problems by providing a no context switch attribute that is much more efficient than the real-time priority because the no context switch attribute bypasses the overhead of scheduling. Moreover, the no context switch attribute may be used to detect whether a thread performs any undesirable operations that can cause the thread to become suspended while in a critical section.

A data structure for an execution thread embodied in computer readable memory is provided in accordance with an embodiment of the present invention. The data structure includes a no context switch attribute. The no context switch attribute is configurable to indicate whether execution of the thread can be suspended.

In another embodiment of the present invention, a computer system is provided. The computer system includes an operating system for performing processes required by an application, a scheduler, controlled by the operating system, for coordinating execution of threads and manage access to system resources and a thread for providing executable instructions, wherein the thread includes a no context switch attribute, the no context switch attribute being configurable to indicate whether execution of the thread can be suspended by the scheduler.

Other embodiments of the present invention includes program storage device that includes program instructions executable by a processing device to perform operations for configuring a user mode thread as a near interrupt disabled priority. A method for configuring a user mode thread as a near interrupt disabled priority is also provided.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing a no context switch attribute that allows a user mode thread to become a near interrupt disabled priority. The no context switch attribute that is much more efficient than the real-time priority because the no context switch attribute bypasses the overhead of scheduling. Moreover, the no context switch attribute may be used to detect whether a thread performs any undesirable operations that can cause the thread to become suspended while in a critical section.

Figure 1:
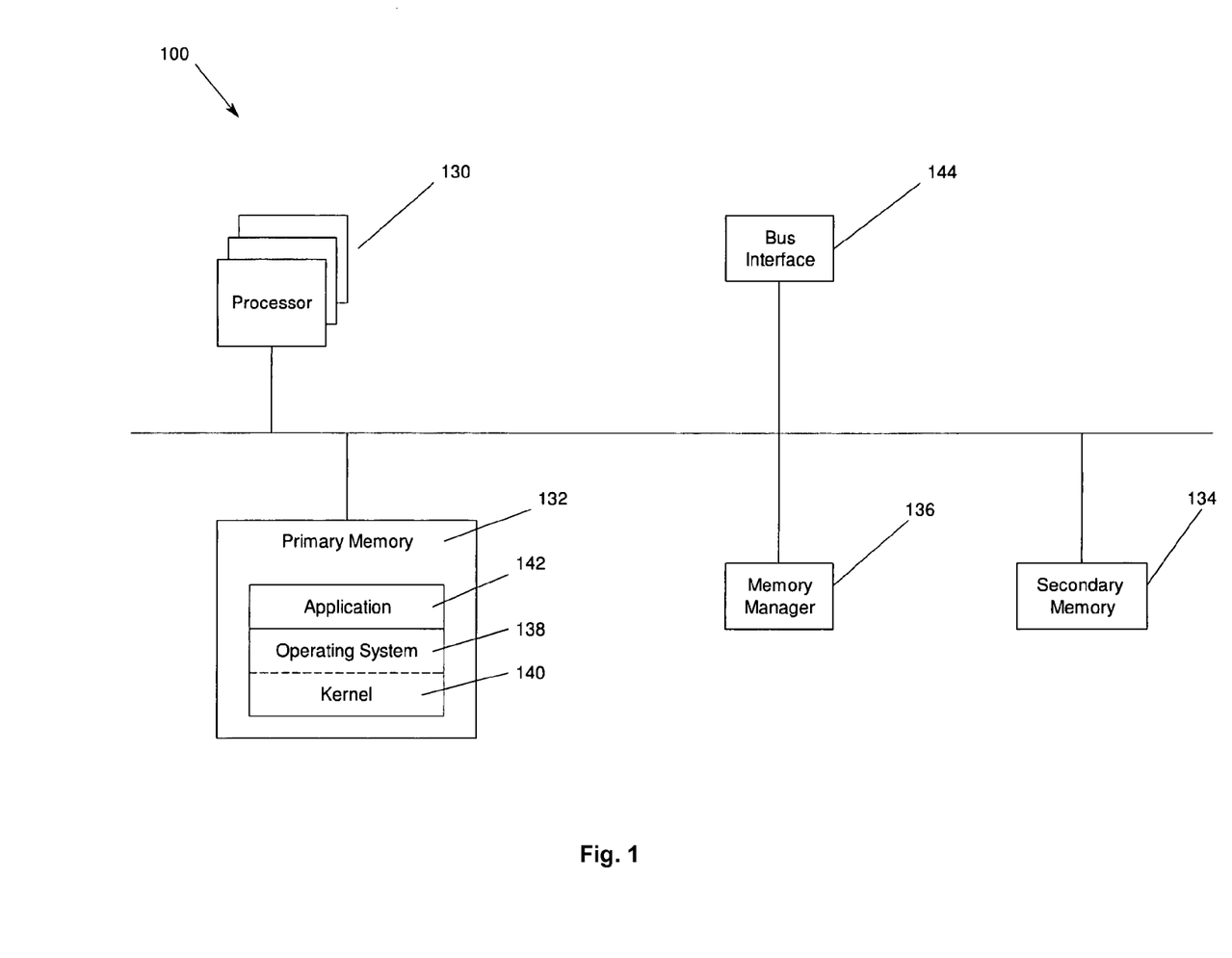
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well-known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
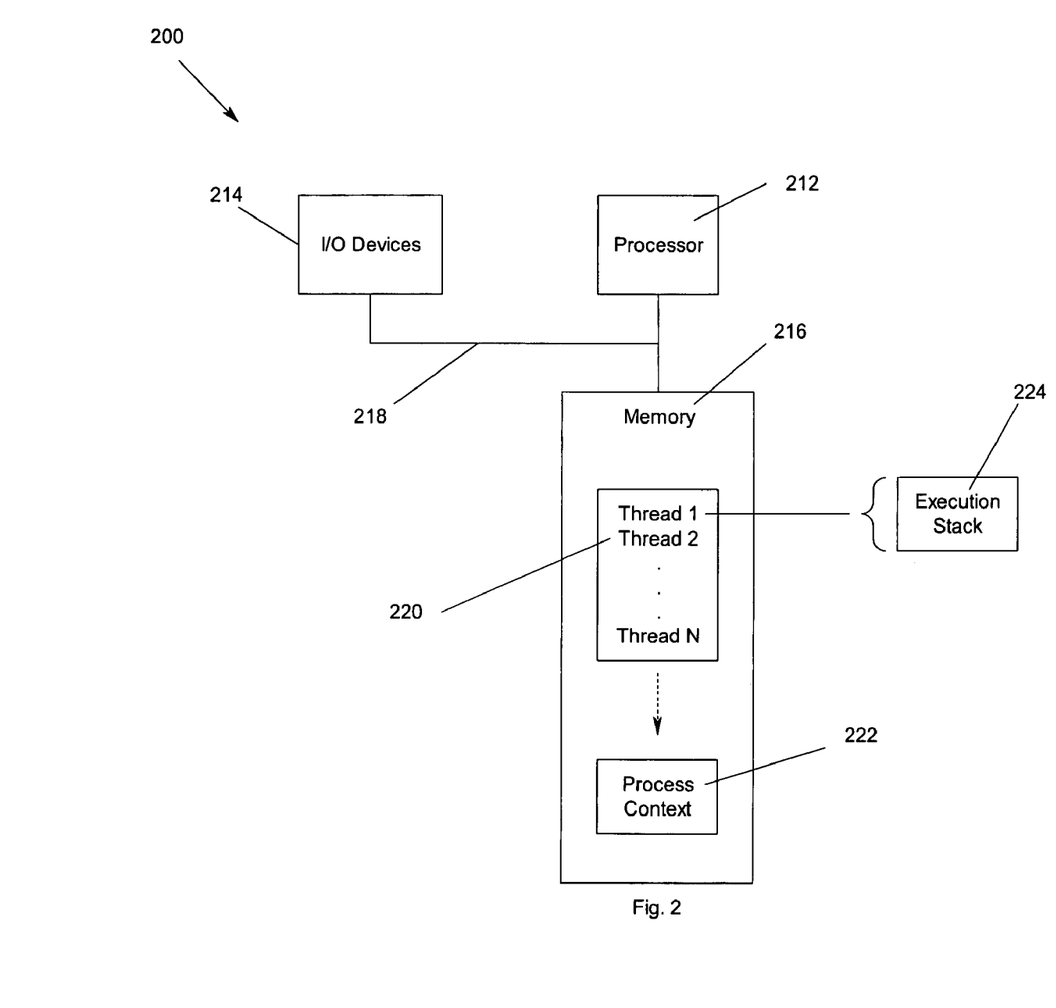
FIG. 2 illustrates a computer system that performs multithreading according to an embodiment of the present invention.

FIG. 2 illustrates a computer system 200 that performs multithreading according to an embodiment of the present invention. In FIG. 2, a bus 218 that connects one processor 212 to various I/O devices 214 and a memory device 216. Memory device 216 includes a set of thread 220, one for each thread associated with a particular process. Each thread includes a data, e.g., an execution stack 224 and a no context switch attribute. The thread values are loaded into processor registers when the thread is executed by the processor 212. The values are saved back in memory 216 when the thread is suspended. Memory device 216 further includes all of the logical addresses for data and instructions utilized by the process, including the stacks of the various threads. After a thread is created and prior to termination, the thread will most likely utilize system resources to gain access to process context 222. Through the process context 222, process threads can share data and communicate with one another in a simple and straightforward manner.

Thread scheduling is an important aspect of implementing threads. In a first category, there are cooperative threads, which do not rely on a scheduler and cooperate among themselves to share the processor. Because of the complexities involved in programming such threads, and because they cannot react quickly to external events, cooperative threads are not utilized much in the art nowadays. In a second category are pre-emptive threads. Such threads rely on a scheduler that can decide to switch the processor from one thread to another at any point during the execution. Pre-emptive threads react quickly to external events because the currently running thread could be pre-empted out of the processor and another thread takes over to handle the emergency, if needed. Unlike cooperative threads, pre-emptive scheduling relieves the programmer from the burden of implementing the scheduling mechanism within the application program.

Pre-emption of a running thread can generally occur at any point during program execution. Typically, pre-emption occurs when a timer expires allowing the scheduler to intervene and switch the processor among threads. In the art, this is referred to as "time slicing" the processor among threads, and each thread is said to run for a "time slice." This form of intervention allows the scheduler to implement various scheduling mechanisms, including round robin, priority scheduling, among others. Additionally, pre-emption could also occur in response to external events that may require the immediate attention of some thread.

As described above, the popularity of open source kernel (e.g. Linux), is leading to more and more controller programs moving to user mode. However, a controller program constantly requires access to hardware in real-time fashion and therefore needs to allow a user mode thread to run in a near interrupt disabled priority. Some real-time operating systems offer special real time priority. However, to provide flexibility, they still might share the priority with other threads at the same real-time priority.

Figure 3:
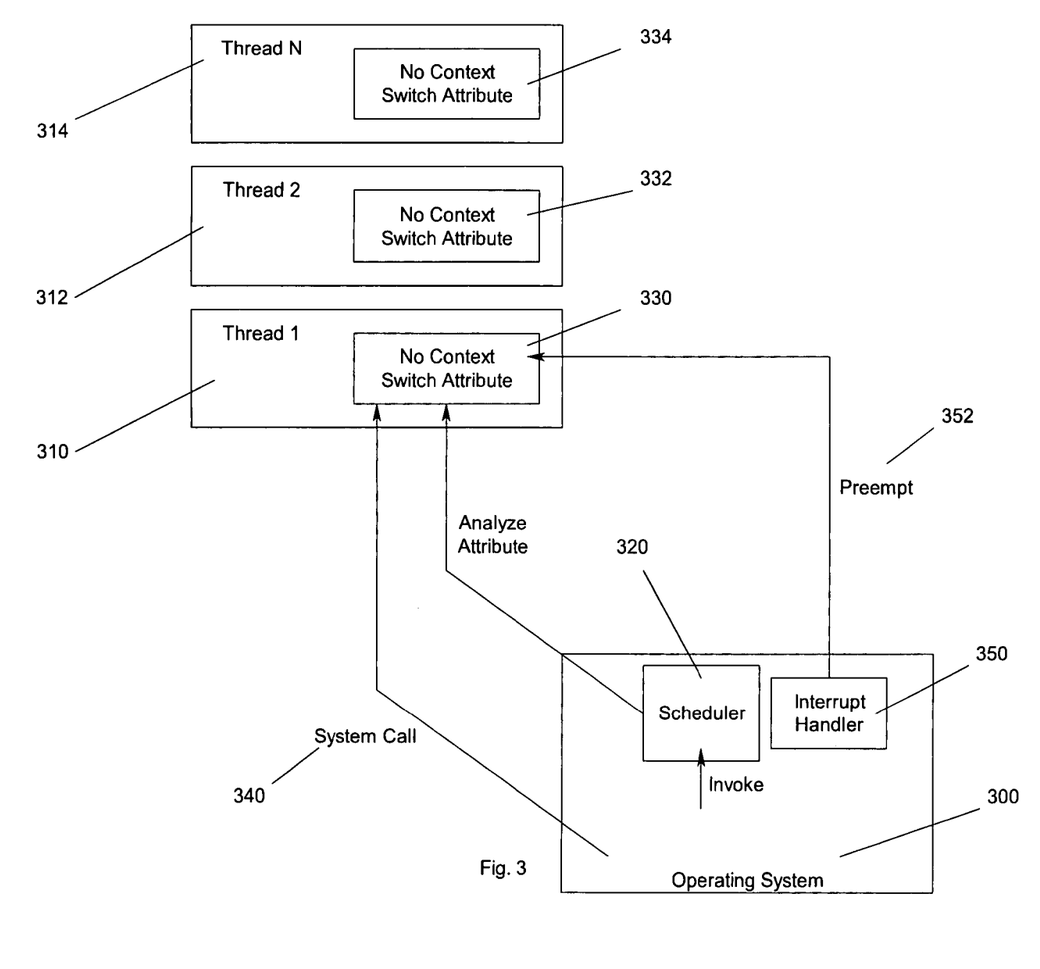
FIG. 3 illustrates functioning of an operating system according to an embodiment of the present invention.

FIG. 3 illustrates functioning of an operating system 300 according to an embodiment of the present invention. In FIG. 3, an operating system includes a scheduler 320. The operating system 300 executes threads 310, 312, 314 to perform the processes required by a user mode application. A scheduler 320 is provided by the operating system to coordinate the execution of threads and to manage their access to the system resources. The scheduler 320 must ensure that threads gain access to the processor for a time relative to its designated priority and class and that no thread is starved of access to the processor, no matter if it is the lowest priority task available. The scheduler 320 may preemptively remove the thread from the processor, for example, at the expiry of it's allocated time quantum when time-slicing scheduling is implemented. The scheduler 320 chooses which is the most appropriate process to run next.

According to an embodiment of the present invention, threads 310, 312, 314 are provided a no context switch attribute 330, 332, 334 to control whether the threads are to be preempted. A system call 340 is provided to allow the no context switch thread attribute 330, 332, 334 to be set and/or cleared. The no context switch attribute 330, 332, 334 are on a per thread basis, i.e., each thread 310, 312, 314 includes a no context switch attribute 330, 332, 334. The scheduler 320 checks the no context switch attribute 330, 332, 334 any time the scheduler 320 is invoked. When a no context switch attribute 330, 332, 334 is set, the scheduler 320 will bypass all scheduling process and just allow the thread to continue. If one of the threads 310, 312, 314 are forced to be suspended when their no context switch attribute 330, 332, 334 is set, the scheduler 320 will clear the no context switch attribute 330, 3332, 334 and send a signal to the thread 310, 312, 314 to indicate that an exception occurred. With the no context attribute 330, 332, 334 is attribute set, the threads 310, 312, 314 will continue to run with no respect to the priority and the time slices. Only the interrupt handler 350 can preempt 352 a thread 310, 312, 314 that has its no context switch attribute 330, 332, 334 set. When the interrupt handler 350 exits, control comes right back to the interrupted thread 310, 312, 314 having the no context switch attribute 330, 332, 334 set.

Figure 4:
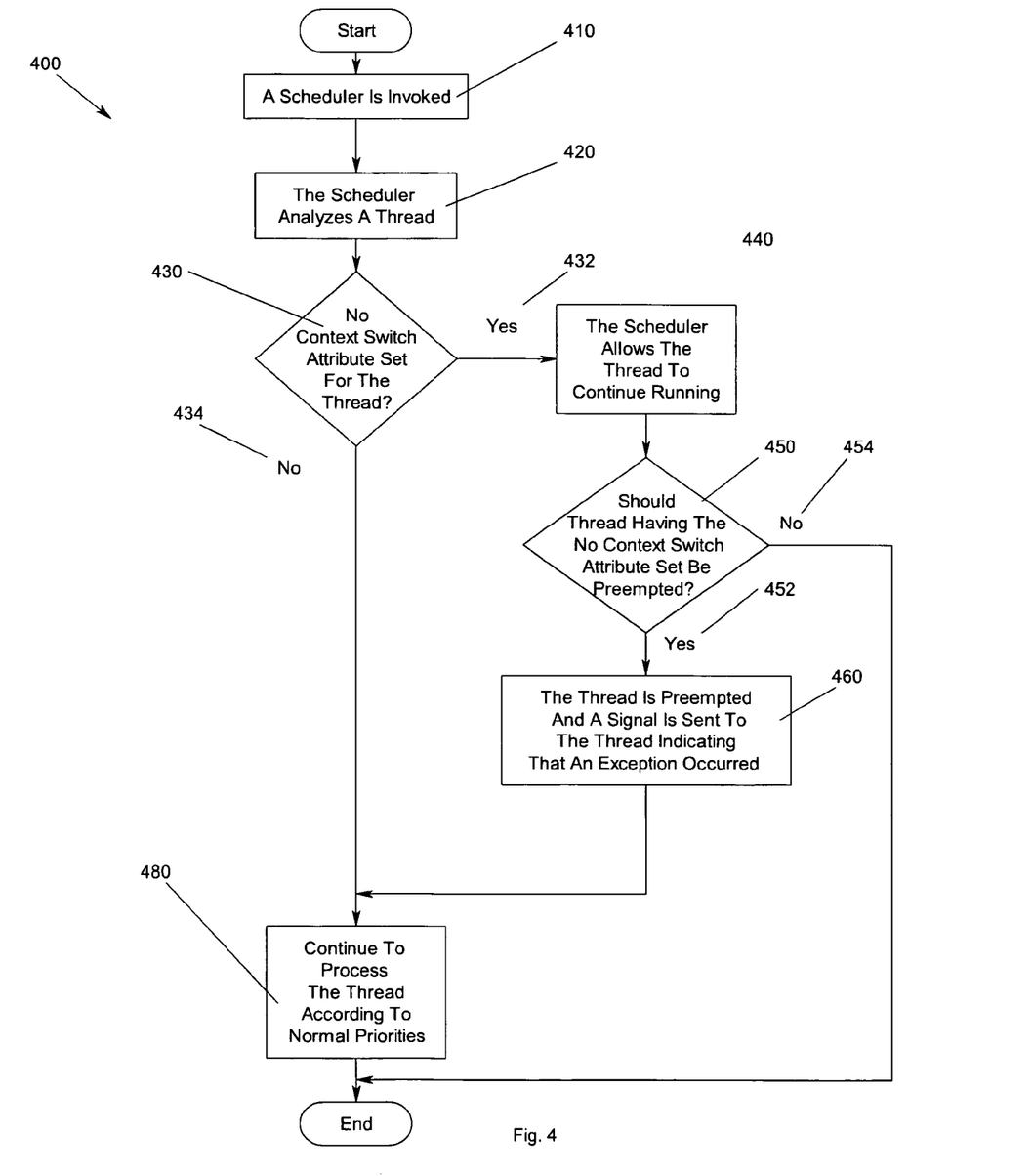
FIG. 4 is a flow chart of the method for using a thread having a no context switch attribute according to an embodiment of the present invention.

FIG. 4 is a flow chart of the method for using a thread having a no context switch attribute according to an embodiment of the present invention. In FIG. 4, a scheduler is invoked 410. The scheduler analyzes a thread 420. A determination is made whether a no context switch attribute is set for the thread 430. If the no context switch attribute is set 432, the scheduler allows the thread to continue running 440. A determination is made whether the thread having the no context switch attribute set forced to be preempted 450. If yes 452, the thread is preempted and a signal is sent to the thread indicating that an exception occurred 460. The preempted thread begins execution again 480. If the thread is not to be preempted 454, the scheduler is exited without a context switch. If the no context switch is not set 434, i.e., clear, the scheduler processes the thread according to normal priorities 480.

Figure 5:
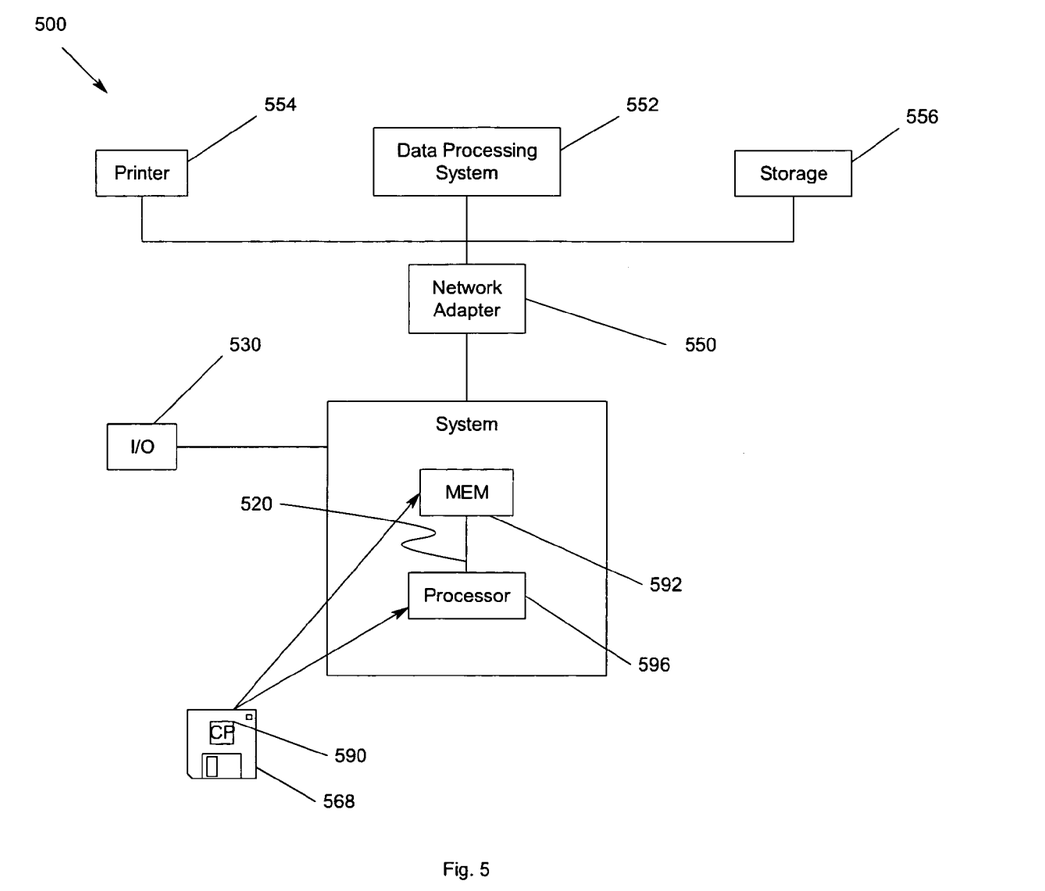
FIG. 5 illustrates a system according to an embodiment of the present invention.

FIG. 5 illustrates a system 500 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 590 accessible from a computer-usable or computer-readable medium 568 providing program code for use by or in connection with a computer or any instruction execution system.

For the purposes of this description, a computer-usable or computer readable medium 568 can be any apparatus that can contain, store, communicate, propagate, or transport the program for use by or in connection with the instruction execution system, apparatus, or device. The medium 568 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 596 coupled directly or indirectly to memory elements 592 through a system bus 520. The memory elements 592 can include local memory employed during actual execution of the program code, bulk storage, and cache memories which provide temporary storage of at least some program code in order to reduce the number of times code must be retrieved from bulk storage during execution.

Input/output or I/O devices 540 (including but not limited to keyboards, displays, pointing devices, etc.) can be coupled to the system either directly to the system or through intervening I/O controllers.

Network adapters 550 may also be coupled to the system to enable the system to become coupled to other data processing systems 552, remote printers 554 or storage devices 556 through intervening private or public networks 560. Modems, cable modem and Ethernet cards are just a few of the currently available types of network adapters.

Accordingly, the computer program 590 comprise instructions which, when read and executed by the system 500 of FIG. 5, causes the system 500 to perform the steps necessary to, execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for facilitating handling of a user mode thread in a computing environment by a processor device, the user mode thread provided a no context switch attribute, the method comprising:
analyzing the user mode thread by a scheduler to determine if the no context switch attribute is set, wherein the no context switch attribute is adapted to detect a plurality of operations capable of causing the user mode thread to become suspended, and if the no context switch attribute is set:
the scheduler allows the user mode thread to continue running, wherein the user mode thread bypasses existing processes scheduled in the scheduler, the user mode thread having a near interrupt disabled priority, and
if the user mode thread is forced to be suspended by an interrupt handler, the scheduler resets the no contexts switch attribute by clearing the no context switch attribute and sends a signal to the user mode thread indicating an exception, wherein the interrupt handler is the only mechanism whereby the user mode thread having the set no context switch attribute may be forced to be suspended, and
upon an exit of the interrupt handler, returning immediate control to the user mode thread with the set no context switch attribute to continue execution, the set no context switch attribute having been previously reset to clear, by the scheduler, prior to the interrupt handler preemptively removing the thread; and
processing the user mode thread by the scheduler in a normal priority if the no context switch attribute is not set.

2. The method of claim 1, further including ensuring, by the scheduler, that the user mode thread gains access to the processor device for a time period, the order and access of the user mode thread being based on a designated priority and class to prevent the user mode thread from being starved of access to the processor device.

3. The method of claim 1, further including determining, by the scheduler, an order for executing the user mode thread.

4. The method of claim 1, further including preemptively removing the user mode thread at the expiry of a time quantum allocated to the user mode thread.

5. A system for facilitating handling of a user mode thread in a computing environment by a processor device, the user mode thread provided a no context switch attribute, the system comprising:
an operating system; an interrupt handler, controlled by the operating system; and
a scheduler, in communication with the interrupt handler, wherein the scheduler is adapted for:
analyzing the user mode thread to determine if the no context switch attribute is set, wherein the no context switch attribute is adapted to detect a plurality of operations capable of causing the user mode thread to become suspended and if the no context switch attribute is set:
the scheduler allows the user mode thread to continue running, wherein the user mode thread bypasses existing processes scheduled in the scheduler, the user mode thread having a near interrupt disabled priority, and
if the user mode thread is forced to be suspended by the interrupt handler, the scheduler resets the no contexts switch attribute by clearing the no context switch attribute and sends a signal to the user mode thread indicating an exception, wherein the interrupt handler is the only mechanism whereby the user mode thread having a set no context switch attribute may be forced to be suspended, and
upon an exit of the interrupt handler, returning immediate control to the user mode thread with the set no context switch attribute to continue execution, the set no context switch attribute having been previously reset to clear, by the scheduler, prior to the interrupt handler preemptively removing the thread; and
if the no context switch attribute is not set, processing the user mode thread in a normal priority.

6. The system of claim 5, wherein the scheduler is further adapted for ensuring that the user mode thread gains access to the processor device for a time period, the order and access of the user mode thread being based on a designated priority and class to prevent the user mode thread from being starved of access to the processor device.

7. The system of claim 5, wherein the scheduler is further adapted for determining an order for executing the user mode thread.

8. The system of claim 5, wherein the scheduler is further adapted for preemptively removing the user mode thread at the expiry of a time quantum allocated to the user mode thread.

9. A computer program product for facilitating handling of a user mode thread in a computing environment by a processor device, the user mode thread provided a no context switch attribute, the computer program product comprising a non-transitory computer-readable storage medium having computer-readable program code portions stored therein, the computer-readable program code portions comprising:

- a first executable portion for analyzing the user mode thread by a scheduler to determine if the no context switch attribute is set, wherein the no context switch attribute is adapted to detect a plurality of operations capable of causing the user mode thread to become suspended and if the no context switch attribute is set:
- the scheduler allows the user mode thread to continue running, wherein the user mode thread bypasses existing processes scheduled in the scheduler, the user mode thread having a near interrupt disabled priority, and
- if the user mode thread is forced to be suspended by an interrupt handler, the scheduler resets the no contexts switch attribute by clearing the no context switch attribute and sends a signal to the user mode thread indicating an exception, wherein the interrupt handler is the only mechanism whereby the user mode thread having the set no context switch attribute may be forced to be suspended, and
- upon an exit of the interrupt handler, returning immediate control to the user mode thread with the set no context switch attribute to continue execution, the set no context switch attribute having been previously reset to clear, by the scheduler, prior to the interrupt handler preemptively removing the thread; and
- if the no context switch attribute is not set, processing the user mode thread in a normal priority.

10. The computer program product of claim 9, further including a second executable portion for ensuring, by the scheduler, that the user mode thread gains access to the processor device for a time period, the order and access of the user mode thread being based on a designated priority and class to prevent the user mode thread from being starved of access to the processor device.

11. The computer program product of claim 9, further including a second executable portion for determining, by the scheduler, an order for executing the user mode thread.

12. The computer program product of claim 9, further including a second executable portion for preemptively removing the user mode thread at the expiry of a time quantum allocated to the user mode thread.

* * * * *